(12) United States Patent
Salvador et al.

(10) Patent No.: US 9,336,772 B1
(45) Date of Patent: May 10, 2016

(54) PREDICTIVE NATURAL LANGUAGE PROCESSING MODELS

(71) Applicant: Amazon Technologies, Inc., Reno, NV (US)

(72) Inventors: Stan Weidner Salvador, Tega Cay, SC (US); Vlad Magdin, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 113 days.

(21) Appl. No.: 14/199,835

(22) Filed: Mar. 6, 2014

(51) Int. Cl.
*G10L 15/00* (2013.01)
*G10L 15/06* (2013.01)
*G10L 15/18* (2013.01)

(52) U.S. Cl.
CPC .............. *G10L 15/063* (2013.01); *G10L 15/18* (2013.01)

(58) Field of Classification Search
None
See application file for complete search history.

(56) References Cited

U.S. PATENT DOCUMENTS

| | | | | |
|---|---|---|---|---|
| 7,542,907 B2* | 6/2009 | Epstein | ................ | G10L 15/183 704/251 |
| 7,747,641 B2* | 6/2010 | Kim | .................... | G06F 1/30548 707/769 |
| 8,145,484 B2* | 3/2012 | Zweig | ................... | G06F 3/0237 704/231 |
| 2002/0087309 A1* | 7/2002 | Lee | ........................ | G06Q 30/06 704/240 |
| 2009/0313017 A1* | 12/2009 | Nakazawa | ......... | G06F 17/2715 704/244 |

* cited by examiner

*Primary Examiner* — Satwant Singh
(74) *Attorney, Agent, or Firm* — Knobbe, Martens, Olson & Bear, LLP

(57) ABSTRACT

Features are disclosed for updating or generating natural language processing models based on information associated with items expected to be referenced in natural language processing input, such as audio of user utterances, user-entered text, etc. Natural language processing models may include, e.g., language models, acoustic models, named entity recognition models, intent classification models, and the like. The models may be updated or generated based on selected features of input data and a machine learning model trained to produce probabilities based on the selected features.

27 Claims, 5 Drawing Sheets

PREDICTIVE NATURAL LANGUAGE PROCESSING MODELS

BACKGROUND

Natural language processing systems typically include one or more models that they use to process input. For example, automatic speech recognition systems typically include an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken. As another example, natural language understanding systems typically include models for named entity recognition, intent classification, and the like. The natural language understanding models can be used to determine an actionable intent from the words that a user speaks or writes.

Acoustic models, language models, natural language understanding models, and other models used in natural language processing (together referred to as natural language processing models) may be specialized or customized to varying degrees. For example, an automatic speech recognition system may have a general or base model that is not customized in any particular manner, and any number of additional models for particular genders, age ranges, regional accents, speakers, or any combination thereof. Some systems may have models for specific subject matter (e.g., medical terminology) or even for specific users.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
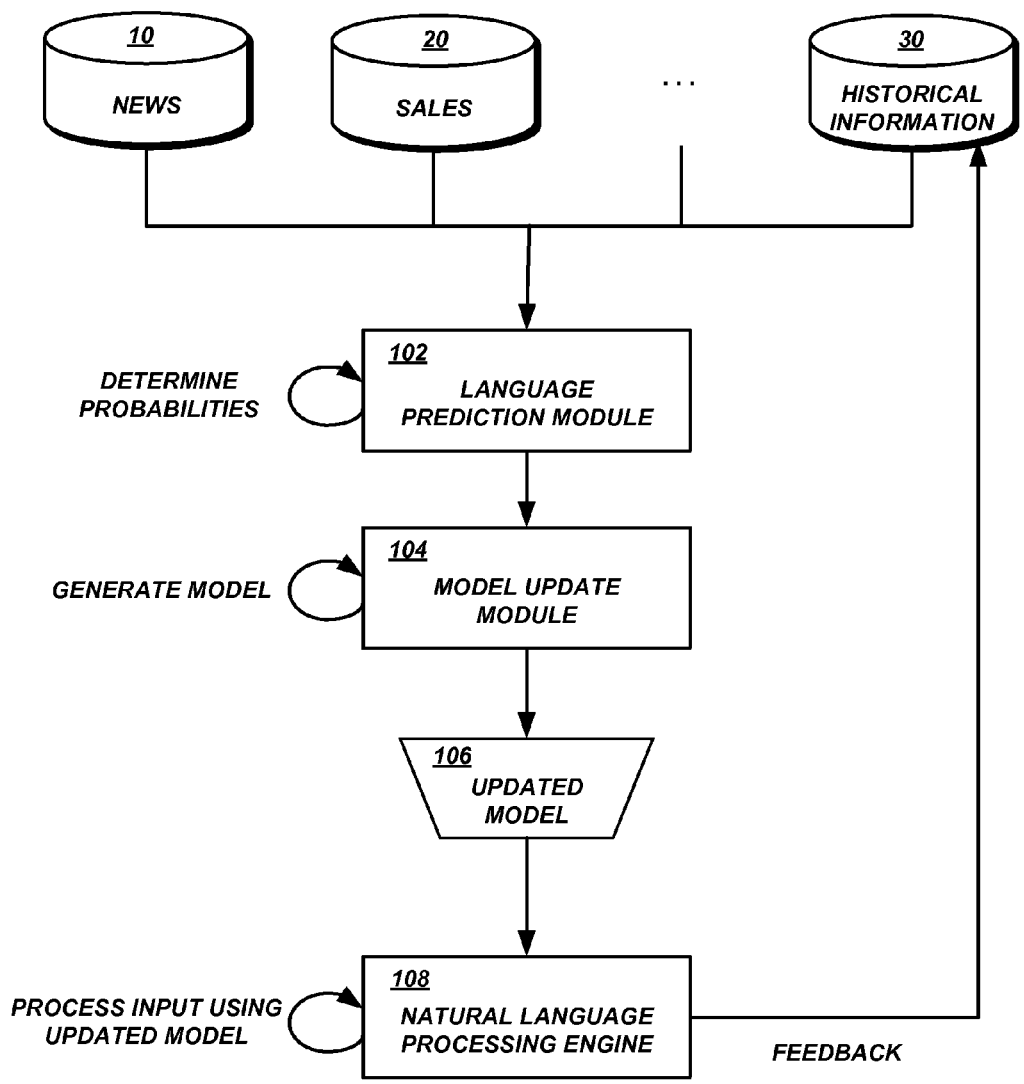
FIG. 1 is a block diagram of an illustrative architecture for model updating and use, including a model update module and example data sources.

The present disclosure is directed to enhancing the ability of natural language processing ("NLP") systems to accurately respond to anticipated changes in language use through the use of predictive NLP models. Accurate natural language processing depends on accurate estimates regarding the likelihood that words and phrases are to be used. Many NLP systems use general models, such as automatic speech recognition ("ASR") models or natural language understanding ("NLU") models that are based on an expected word usage of a general population. Such general models are typically based on observed language usage in a corpus of pre-existing training data. When new items (e.g., products or services) are initially introduced, the names of the items can be challenging to recognize using general models because the words and phrases used to name the items may not have appeared in the pre-existing data used to train the models. Items that are new to a particular catalog (e.g., new movies released on a streaming video service) can be added to the models with default probabilities, but probabilities can vary widely depending on how popular a particular item is. For example, when two new movies are added to the streaming video service, the probability that users will reference the first new movie may be substantially different than the probability that users will reference the second movie. Some systems may update models based on observed real-world usage. However, for items which are referenced many times for only a short period (e.g., titles of new holiday-themed movies), usage of the words may have ceased by the time the model is updated to reflect the increase in real-world use. In such cases, the model will then have probabilities that are too high rather than too low.

Aspects of the present disclosure relate to updating models for use by natural language processing systems, such as those that perform ASR and/or NLU, based on information regarding particular items that are expected to be released soon (e.g., new products or services) or items with varying demand (e.g., seasonal products or services). The information may be obtained from any number of data sources. For example, information about movies that are to be released on a video streaming service may be obtained from sources that report box office revenue, current events news sources, and the like. Titles of movies with high box office revenue and movies which are discussed by news outlets may have a higher probability of being spoken by a user than titles of movies with low box office revenue and movies which are rarely discussed by news outlets. As another example, titles of movies with holiday-related subject matter may be more likely to be spoken by a user around a particular holiday than at any other time of year. The data obtained from data sources and used to generate predictions may be generally referred to as "language use prediction data." In some embodiments, a system or service can obtain data from one or more data sources and calculate a probability that a particular word or sequence of words will be spoken. The probabilities may then be used to update an existing model or generate a new predictive model. The updated or new predictive model may be used alone, or it may be used in conjunction with or in addition to a general model.

Additional aspects of the present disclosure relate to generating factors or offsets which may be used to update probabilities in a pre-existing model. The factors or offsets may be used to adjust the probabilities, associated with particular words or phrases in the pre-existing model, up or down relative to some previously determined probability. For example, a system or service can obtain data regarding upcoming move releases, as described above. Rather than determining an actual probability that a particular word or phrase will be used, the system can determine how much an existing probability is to be adjusted. Illustratively, a particular word or phrase may be twice as likely, 10× as likely, or 100× times as likely to be spoken as before (e.g., a title of a new release of a hit movie on a streaming video service). Accordingly, a factor of 2, 10, or 100 may be applied to the existing probability. As another example, a particular word or phrase may be half as likely, $\frac{1}{10}$th as likely, or $\frac{1}{100}$th as likely to be spoken as before (e.g., a title of a holiday-themed move after the holiday has passed). Such factors may be applied to the probabilities of a general model, or to the probabilities of some additional model such as a separate predictive model. In some embodiments, offsets may be used instead of, or in addition to, factors. For example, probability may be increased or decreased by adding some offset, rather than by multiplying by some factor.

Further aspects of the present disclosure relate to using updated or predictive models to perform NLP tasks, such as ASR and NLU. Such models may be used alone, or they may be used in conjunction with one or more general models and/or additional models. For example, when an ASR module performs ASR on a particular utterance, the ASR module may first process the utterance in a process known as "scoring" using a general model (e.g., a model based on the vocabulary of a general population and/or pre-existing items in a catalog). The ASR module may then re-process the results in a process known as "rescoring" using a predictive model (e.g., a model including words/phrases and corresponding probabilities for new items in the catalog). As another example, the ASR module may interpolate a predictive language model and a general model. The various models may be weighted such that, e.g., new items will be recognized with a high degree of accuracy due to use of the predictive model, while other items may also be recognized with a high degree of accuracy due to the use of the general model. In some embodiments, as described in greater detail below, techniques other than language model rescoring or language model interpolation may be used. In some embodiments, as described in greater detail below, predictive NLU models may be used in some combination with general and/or additional models.

Although aspects of the embodiments described in the disclosure will focus, for the purpose of illustration, on updating or generating models for items such as products and services, one skilled in the art will appreciate that the techniques disclosed herein may be applied to any number of applications. For example, models may be updated to account for changing probabilities in usage of terms related to current events, slang, and the like. Various aspects of the disclosure will now be described with regard to certain examples and embodiments, which are intended to illustrate but not limit the disclosure.

With reference to an illustrative embodiment, FIG. 1 shows a language prediction module 102 configured to determine probabilities of future use of words/phrases based on information obtained from various data sources. A model update module 104 can use the determined probabilities to update a model 106 (or generate a new model). Illustratively, the updated model 106 may be an ASR model (e.g., language model or acoustic model), NLU model, or any other model used by a natural language processing system. The updated model 106 can then be used by a natural language processing engine 108 to more accurately process input, such as a user utterance, that includes words or phrases that may not have been in use by the general population until recently (or which may still not be in use but which are expected to be used in the future, such as after a release date of a new item).

Generally described, the language prediction module 102 can use any information relevant to predicting the future use of words/phrases. Such information may be referred to as language use prediction data or language use prediction information. The language use prediction information may come from various data sources. The data sources may be associated with the language prediction module 102 or with a natural language processing system of which the language prediction module 102 is a part. The data sources may also or alternatively be separate from the language processing system. In some embodiments, the language prediction module 102 may obtain information regarding a particular item (or items) that is a candidate for addition to a predictive model, such as new movie release. In additional embodiments, the language prediction module 102 may obtain information generally, and determine which items to add to the predictive model based on, e.g., a high predicted probability of use.

In some embodiments, the language prediction module 102 can use information including, but not limited to, news information from a news data source 10, sales information from a sales data source 20, trending topic information (e.g., occurrences of words in weblogs, microblogs, and social networks), temporal information (e.g., season, date, time of day), information from an application that uses the services of the natural language processing engine 108 (e.g., a list of upcoming releases by an online retailer or video streaming service), and the like. In some embodiments, historical information may be used. Historical information may include information about past usage of words/phrases, including observed use by the natural language processing engine 108 or an application that uses the services of the natural language processing engine 108. For example, each time (or some subset thereof) that the natural language processing engine 108 produces results, information regarding the results may be provided to a historical information data store 30. The information may include the results (or data derived therefrom), timing information (e.g. the date and/or time that the results were produced), a user identifier, etc.

The language prediction module 102 can obtain raw data from the data sources and extract data useful for determining probabilities or otherwise predicting future language use. For example, the language prediction module 102 can use feature selection/feature extraction in order to obtain features from raw data for use by a learning model. A learning model may be a machine learning model, such as a classifier or regression. The learning model may be trained to calculate the likelihood that a particular word or sequence of words will be used based on the extracted feature data.

In one illustrative, non-limiting example, a movie streaming service may use a natural language processing engine 108 to provide speech recognition features to its users. The movie streaming service may be preparing to add several new movies the service. Although each movie is being newly added to the service, titles of some of the added movies may be uttered by users substantially more or less than titles of other added movies. The language prediction module 102 can obtain data from various sources, including the movie streaming service and other sources 10, 20, 30, etc. The language prediction module 102 may extract certain information relevant to predicting future utterances of movie titles by users of the movie streaming service. In some embodiments, the particular features to be extracted may be chosen by a human. The features may be chosen based on some expected correlation to usage probability. For example, a system developer or administrator may program or otherwise instruct the language prediction model that data useful in predicting the future use of a movie title includes: how long the movie has been available; whether the movie is a new release; how often it has been watched in some recent time period; total box office receipts when the movie was in theaters; price to stream the movie; user reviews and ratings of the movie; professional reviews and ratings of the movie; whether the movie is available exclusively through the movie streaming service; and the like.

The language prediction module 102 can use the machine learning model to produce probabilities based on the input data described above. The probabilities can be provided to a model update module 104, which can use the probabilities to update a model 106 (or generate a new model) as described in greater detail below. Advantageously, the updated model 106 may include accurate predictions (within some margin of error) regarding usage of words/phrases in the movie titles, even though the movies have not yet been released on the movie streaming service, and even though users may not have uttered the movie titles to the natural language processing engine 108 before. The natural language processing engine 108 can provide feedback regarding real-world usage of the movie titles to the historical information data store 30. Such real-world usage information may be used to produce a subsequent, updated version of the model 106, may be used to train the general model, etc.

The movie streaming example and other examples used herein are illustrative only, and are not intended to be limiting. The systems and methods described herein may be used to generate predictive models for any specific application or for general use.

Natural Language Processing System Environment

Figure 2:
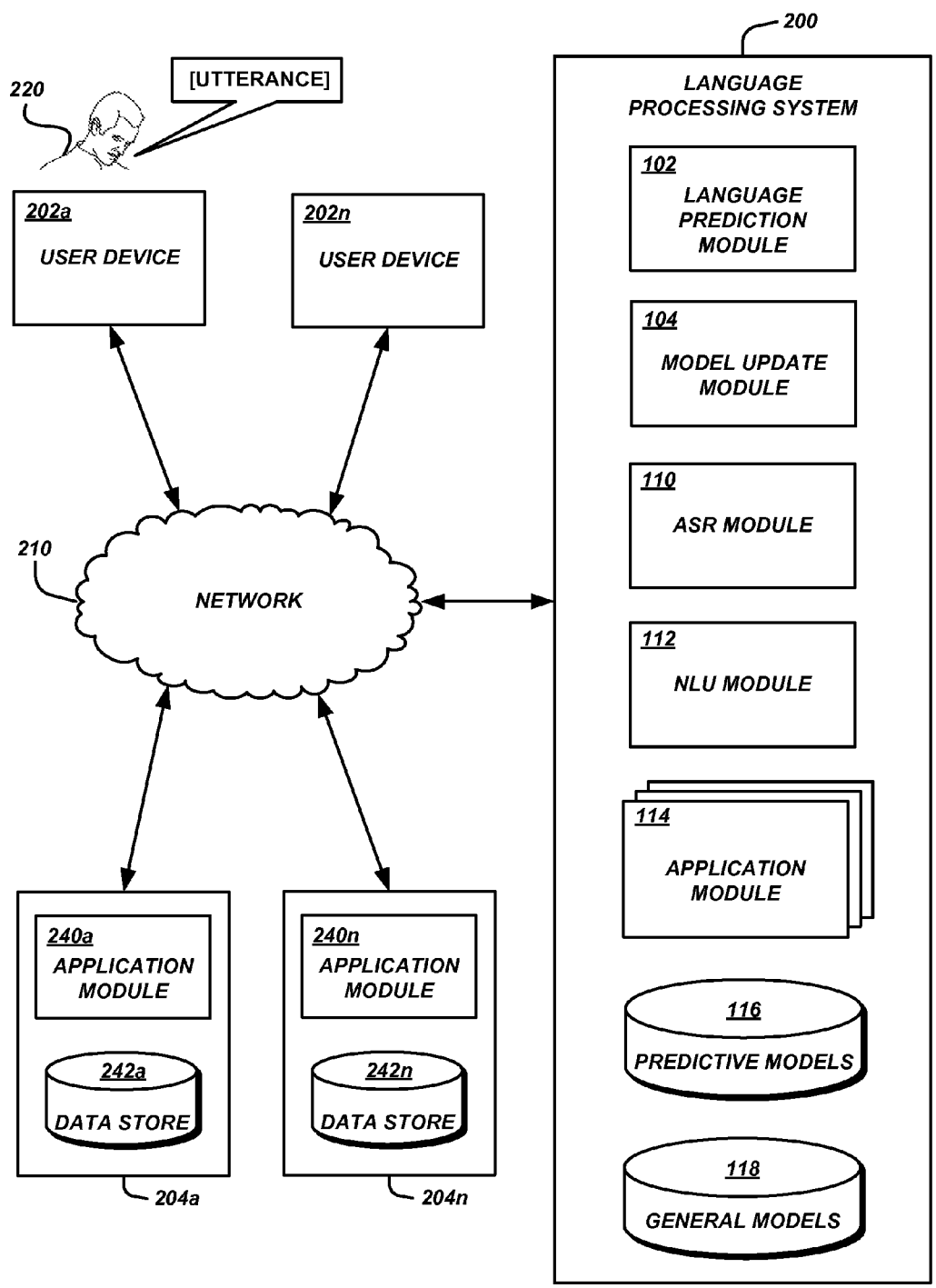
FIG. 2 is a block diagram of an illustrative natural language processing system in a network environment, showing example modules and data stores of the natural language processing system.

FIG. 2 shows an example networked language processing system environment in which the features and processes described herein may be implemented. The networked environment shown in FIG. 2 includes a language processing system 200, multiple user devices 202a-202n, and multiple data sources 204a-202n. The various systems may communicate with each other via a communication network 210. The network 210 may be a publicly accessible network of linked networks, possibly operated by various distinct parties, such as the Internet. In other embodiments, the network 210 may include a private network, personal area network, local area network, wide area network, cable network, satellite network, cellular telephone network, etc. or combination thereof, each with access to and/or from the Internet.

The language processing system 200 can be a computing system configured to process user utterances to generate transcripts of the utterances and/or to perform actions in response to the utterances. In some embodiments, language processing system 200 can be a server or group of servers that may be accessed via the network 210. The language processing system 200 can include various components, such as a language prediction module 102, a model update module 104, an ASR module 110, an NLU module 112, one or more application modules 114, a predictive models data store 116, and a general models data store 118. In some embodiments, the language processing system 200 may have fewer or additional modules, components, or data stores than those shown in FIG. 2. For example, general models and predictive models may not be separate models, but rather may be combined. In this example, the process of updating the model works by adding information to the general model, rather than generating a separate predictive model. In such cases, there may not be separate data stores for the predictive models and general models.

The language processing system 200 may include multiple computing devices, such as computer servers, logically or physically grouped together. The components of the language processing system 200 can each be implemented as hardware, such as one or more server computing devices, or as a combination of hardware and software. In some embodiments, the components of the language processing system 200 can be combined on one server computing device or separated individually or into groups on several server computing devices. For example, a language prediction module 102 and a model update module 104 may be implemented on their own server or group of servers, separate from each other or from servers that implement an ASR module 110 and/or an NLU module 112. As another example, an ASR module 110 may be implemented on the same server or group of servers as an NLU module 112. As yet another example, multiple ASR modules 110 and/or NLU modules 112 may be implemented as scalable computing systems that can scale responsive to current conditions (e.g., network conditions, processing load, computing resource availability, etc.). The predictive models data store 116 and/or general models data store 118 may be implemented on a server or group of servers separate from the other modules or components of the language processing system 200, such as a database server.

In some embodiments, the features and services provided by the language processing system 200 may be implemented as web services consumable via the communication network 210. In further embodiments, the language processing system 200 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The user devices 202a-202n can correspond to a wide variety of computing devices, including personal computing devices, laptop computing devices, hand held computing devices, terminal computing devices, mobile devices (e.g., mobile phones or tablet computing devices), wearable devices configured with network access and program execution capabilities (e.g., "smart eyewear" or "smart watches"), wireless devices, electronic readers, media players, gaming consoles, set-top boxes, televisions configured with network access and program execution capabilities (e.g., "smart TVs"), and various other electronic devices and appliances.

The data sources 204a-204n can correspond to a logical association of one or more computing devices for hosting interactive content and processing user interactions over the network 210. For example, data source 204a may include a server that hosts an application module 240a for providing music or video playback capabilities. The data source 204a may also include a server that hosts a data store 242a for storing data regarding the music or video catalog, usage data regarding requests to listen to and/or view content, etc. As another example, data source 204b may include an application module 240b for providing shopping services, and a data store 242b for storing shopping information, such as a product catalog, sales history, and the like.

Process for Updating Models

Figure 3:
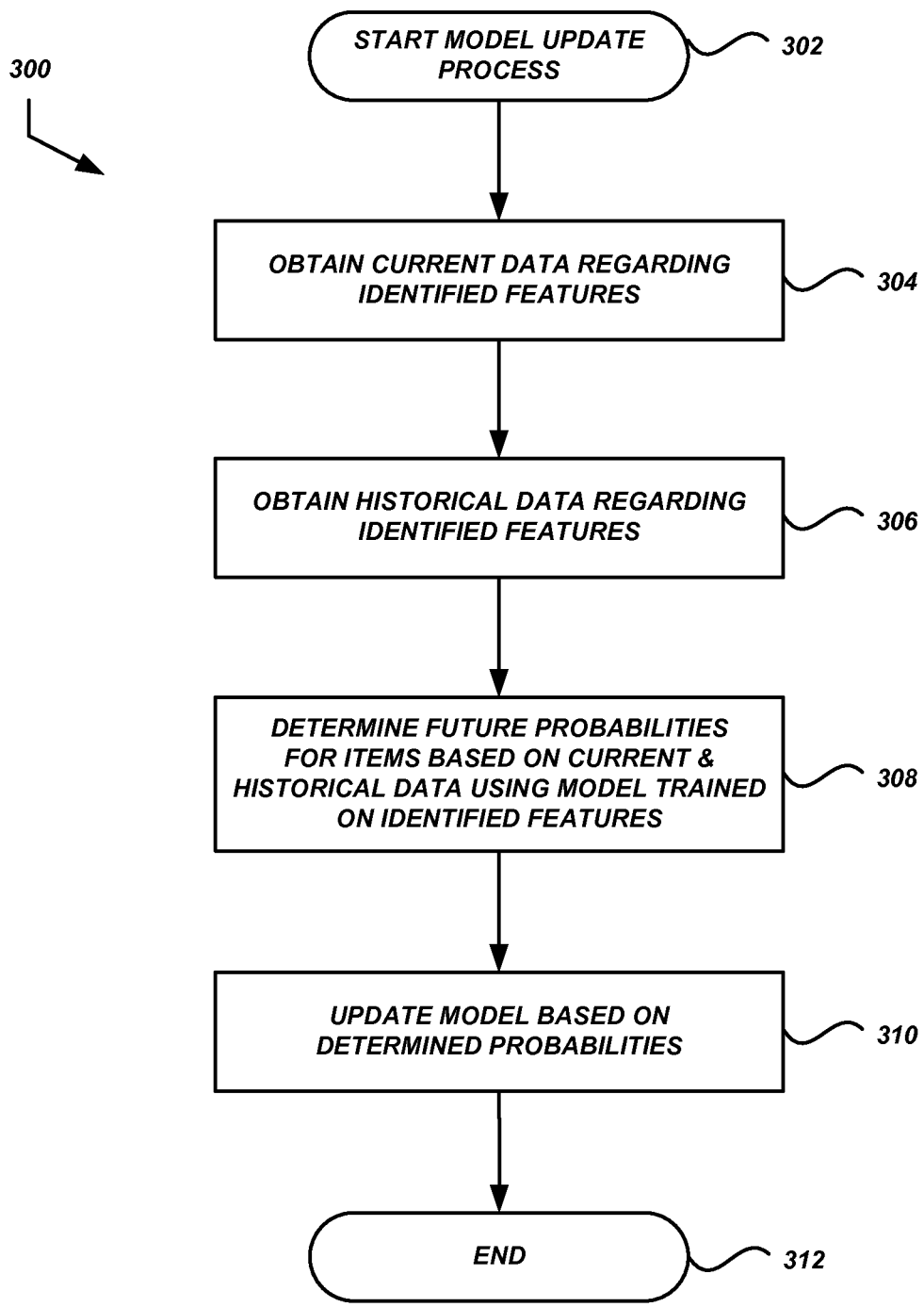
FIG. 3 is a flow diagram of an illustrative process for updating natural language processing models.

FIG. 3 illustrates a sample process 300 for updating a NLP model (or generating a new NLP model). Advantageously, a language prediction module 102 and a model update module 104 (or one combined module, or some other module, component, or system) may execute the process 300 to update the NLP model based on data received from various data sources. The resulting updated model can improve recognition of utterance content (e.g., terms, entities, or intents) regarding items, such as products or services, which may be new or which may be associated with variable use. For example, ASR models, such as acoustic models or language models, may be updated or generated to recognize terms (e.g., words/phrases) for new items expected to be used in user utterances. Additionally or alternatively, NLU models, such as models for named entity recognition or intent classification, may be updated or generated to recognize entities or intents that may be associated with the new items. In some embodiments, NLP models may be updated and used to process textual input that is not generated by an ASR module (e.g., NLU models used to process user-submitted text, such as text submitted in a search field). In such cases, the predictions may not be predictions of "utterance content," but rather predictions of named entities or intents generally. In some embodiments, several models may be generated, such as separate models for each of several domains (e.g., video streaming, music playback, shopping, etc.).

The process 300 begins at block 302. For example, process 300 may begin manually or automatically upon receipt of data from one or more data sources, upon request by an application or service that uses a natural language processing engine 108, etc. The process 300 may be embodied in a set of executable program instructions stored on non-transitory computer-readable media, such as short-term or long-term memory of one or more computing devices associated with the language processing system 200. When the process 300 is initiated, the executable program instructions can be loaded and executed by the one or more computing devices.

At block 304, current data including features to be processed by a machine learning model may be obtained. As described above, the particular features may be chosen by a person, automatically identified using feature extraction, or determined using some other process. The feature data may be obtained from data sources internal or external to the language processing system 200, as described above. The data may have been obtained from the one or more data sources prior to initiation of the process 300 and stored in a data store, or it may be retrieved during execution of the process 300.

At block 306, historical data including features to be processed by the machine learning model may be obtained. In some embodiments, receipt of historical data may be optional or excluded, and probabilities may be determined as described below using the current data alone or in conjunction with data other than historical data. As with the current data described above, historical data may be obtained from data sources internal or external to the language processing system 200. The data may have been obtained from the one or more data sources prior to initiation of the process 300 and stored in a data store 30 (e.g., feedback data received from natural language processing engine 108 during operation), or it may be retrieved during execution of the process 300.

At block 308, the language prediction module 102 or some other module or component of the language processing system 200 can calculate or otherwise determine probabilities for items based on the current data (and, in some embodiments, the historical data) received above. The data may be processed by a machine learning model, such as a classifier or regression model trained on training data regarding the selected features. For example, the model may be trained to calculate probabilities that particular words or phrases will be used in the future based on data received from data sources above, such as sales data, news data, data from social media, prior usage patterns, and the like. As another example, the model may be trained to calculate relative offsets or factors to be applied to previously determined or otherwise existing probabilities. Rather than calculating an actual probability that a particular word or phrase will be used in the future, the model may instead determine how much more likely the word or phrase is to be used in comparison with a previously determined probability. The difference may be calculated as an offset (e.g., an amount to be added to or subtracted from a prior probability), or the difference may be calculated as a factor (e.g., an amount or ratio by which the prior probability is to be scaled or multiplied). In some embodiments, a machine learning model may not be used, or may not be used exclusively. Any prediction technique that detects, determines, or otherwise uses relationships between information received from the data sources and the probability that particular words or phrases will be used more or less in the future than in the past may be used.

In one specific, non-limiting example, the probabilities produced by the language prediction module 102 may each correspond to one in a list of terms (e.g., for an ASR model) or entities or intents (e.g., for an NLU model) that users are more likely or less likely to include in future utterances than in presently or previously received utterances. The terms, entities or intents may be present in a general model. However, in the general model the predicted terms, entities or intents may be associated with low probabilities such that an ASR module 110 or NLU module 112 may not accurately discriminate between the predicted items and other similar items that a user is less likely to include in an utterance. In the list generated above, the terms, entities or intents may be associated with higher probabilities that more accurately reflect the likelihood that a user will include the particular terms, entities or intents in future utterances.

The number of terms, entities, or intents for which probabilities are predicted may be based at least partly on a listing of new or soon-to-be released items. In some embodiments, the number of terms, entities, or intents may be determined dynamically based on the data (e.g., there may be a large number of new movies being released around the time of one execution of the process 300, but very few released around some other execution of the process 300). In additional embodiments, the number of terms, entities, or intents predicted in block 308 may be based at least partly on a determination of the relative importance of the accuracy provided by the model in comparison with the computing performance when using the model. For example, if accuracy is determined to be more important than latency, resource usage, or other performance metrics, then the size of the predictive model may be quite large and, therefore, the number of predictions or recommendations for terms, entities, or intents to use in the predictive model may be quite large. However, in a computing environment with limited resources, or in situations where performance may be more important than achieving the highest levels of accuracy, the predictive model may be smaller.

At block 310, the model update module 104 or some other module or component of the language processing system 200 can update a predictive model using the probability predictions regarding anticipated future use of particular utterance content, as determined above. In some embodiments, the model update module 104 may update a language model for use by the ASR module 110, such as a grammar or statistical language model. For example, if the expected speech is very regular (e.g., "play <movie title>") such that the pattern can be learned using machine learning or manually provided by a person, then the language model may be a weighted grammar. The weights for particular portions of the grammar (e.g., corresponding to words, phrases, slots, etc.) can be updated in the grammar using the predictions determined above. This implementation may be useful in certain restrictive cases, such as purchasing items, requesting items, searching for items, initiating playback or execution of some item, etc.

In some embodiments, previously determined probabilities included in a model for particular utterance content (e.g., unigrams, bigrams, or trigrams of words in the title of a movie to be added to a video streaming service) may be offset or scaled according to a prediction generated by the language prediction module 102. For example, a scaling factor greater than or equal to zero (0) may be applied. When the scaling factor is between zero (0) and one (1), the previously determined probability will be reduced (e.g., for a holiday movie after the holiday has passed, or for a movie that was a box office failure). When the scaling factor is greater than one (1), the previously determined probability will be increased (e.g., for a holiday movie when the holiday is approaching, or for a movie that was a box office success). As another example, an offset which may be some negative or positive number (or zero) may be added to or subtracted from a previously determined probability. Illustratively, when a negative number is added to a probability, the probability will be reduced; when a positive number is added to a previously determined probability, the probability will be increased. Alternatively, the previously determined probabilities included in the model may be replaced by probabilities determined above in block 308.

In some embodiments, n-grams (e.g., unigrams, bigrams, trigrams, etc.) may be added to an existing model, such as a statistical language model ("SLM") that does not currently include n-grams for words or phrases in the name of an item identified as having an increased likelihood of being used in an utterance. For example, if a title of a soon-to-be-released movie includes an unusual sequence of words, or a made-up word, then one or more n-grams may not currently exist in the SLM for the movie title. Appropriate n-grams and associated scoring data (e.g., scores, weights, probabilities, likelihoods, etc.) may be added to the SLM in such cases.

In some embodiments, a new, separate predictive model may be generated. For example, the model update module 104 may first generate an intermediate grammar specification with a list of terms and associated probabilities or weightings to be included in the model. The model update module 104 may then generate a more efficient version of the model, such as compiled finite state transducer ("FST"). In some embodiments, the predictive model may be compiled into and with a global and/or some additional model. For example, a single FST model may be generated for use by an ASR module 100, without generating any truly separate predictive model.

As described above, the model update module 104 can also or alternatively generate other types of NLP models, such as an NLU module that can be used for named entity recognition or intent classification. In some embodiments, the predictions may be used as features input to the training of predictive NLU models for named entity recognition and/or intent classification, along with the general and/or additional models, resulting in a model that incorporates information from multiple sources.

In some embodiments, the model update module 104 may determine weights for the predictive model, general model, and/or various additional models in systems which use multiple models to decode or score input. As described in greater detail below, an ASR or NLU module using predictive models may also use a general module, or multiples of one or both. In such cases, the various models may be interpolated. In order to facilitate the use of the multiple models to process a single utterance, each model may be weighted. The weightings can emphasize predictive models over general models. For example, the weightings may be determined such that terms or intents in the predictive model are given more weight than similar or confusable terms in the general model. In some embodiments, weights may be determined or updated during ASR or NLU processing, as described in greater detail below.

The process 300 terminates a block 312.
NLP with an Updated Model

Figure 4:
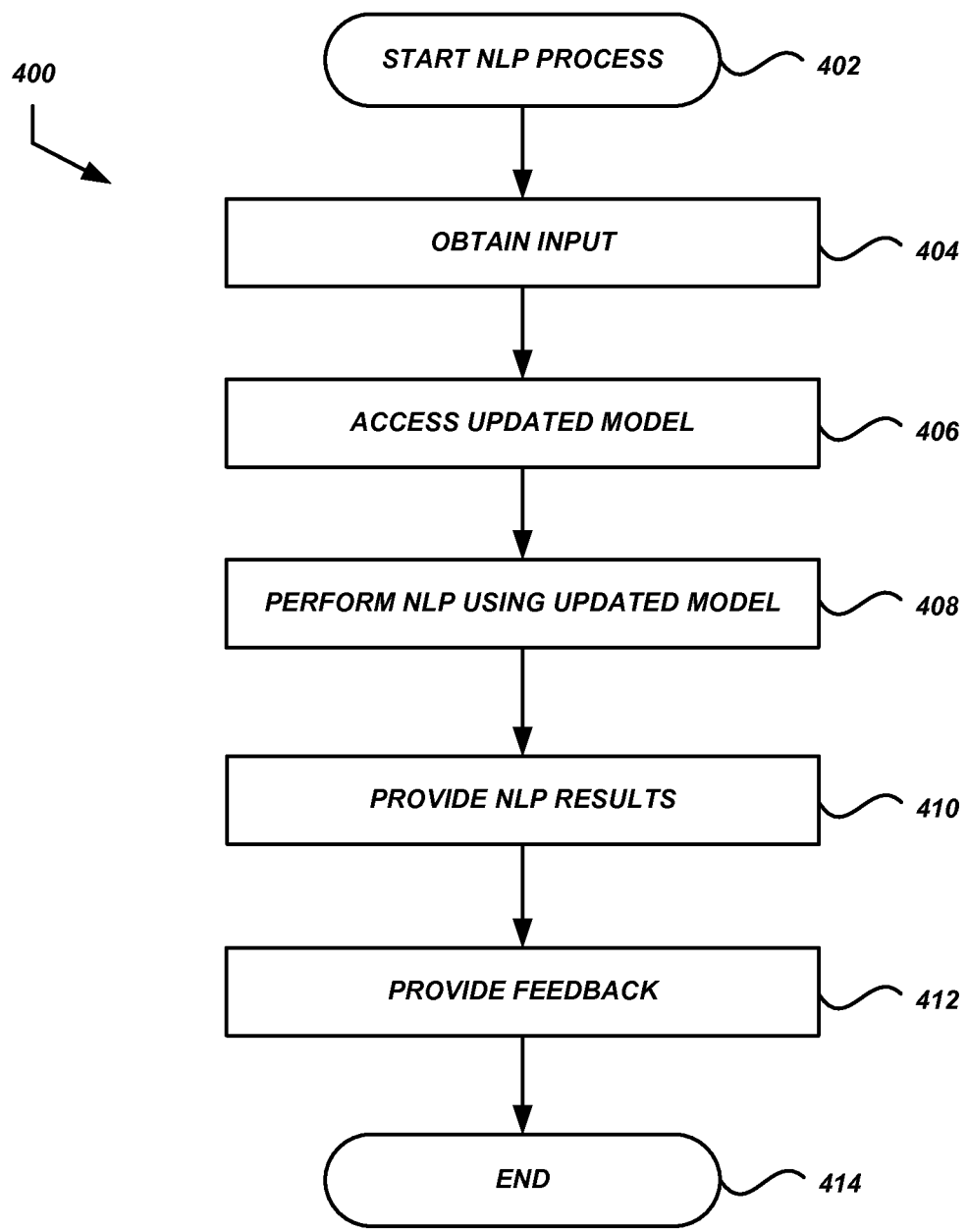
FIG. 4 is a flow diagram of an illustrative process for using updated models to perform natural language processing.

FIG. 4 illustrates a sample process 400 for performing NLP on input, such as an utterance, text, or the like using a predictive model. Advantageously, a natural language processing engine 108 may execute the process 400 to generate results that are more accurate than NLP with only a general model when a new item or an item with variable demand is included in the input to be processed.

The process 400 begins at block 402. For example, the process 400 may begin manually or automatically upon receipt of input, such as an utterance. The process 400 may be embodied in a set of executable program instructions stored on non-transitory computer-readable media, such as short-term or long-term memory of one or more computing devices associated with the language processing system 200. When the process 400 is initiated, the executable program instructions can be loaded and executed by the one or more computing devices.

At block 404, the natural language processing engine 108 or some other module or component of the language processing system 200 obtains input, such as audio of a user utterance, ASR results for the current utterance (e.g., a transcript, n-best list of transcripts, lattice), user-entered text, etc.

At block 406, the natural language processing engine 108 or some other module or component of the language processing system 200 can access an updated NLP model. In some embodiments, a general model and/or one or more additional models may also be accessed.

At block 408, the natural language processing engine 108 or some other module or component of the language processing system 200 can perform NLP using the updated model.

At block 410, the natural language processing engine 108 or some other module or component of the language processing system 200 can provide NLP results to an application module 114, an external service, a user device 202, etc.

At block 412, the natural language processing engine 108 or some other module or component of the language processing system 200 can provide feedback regarding NLP processing. The feedback may include NLP results, summary information about observed uses of words or phrases in the updated model, or the like. Such feedback may be provided to some other module of the language processing system 200, stored in a historical information data store 30, etc. Illustratively, the feedback data may be used during the process 300 described above to generate additional or updated predictive models, or to generate new or updated general models based on real-world results.

Figure 5:
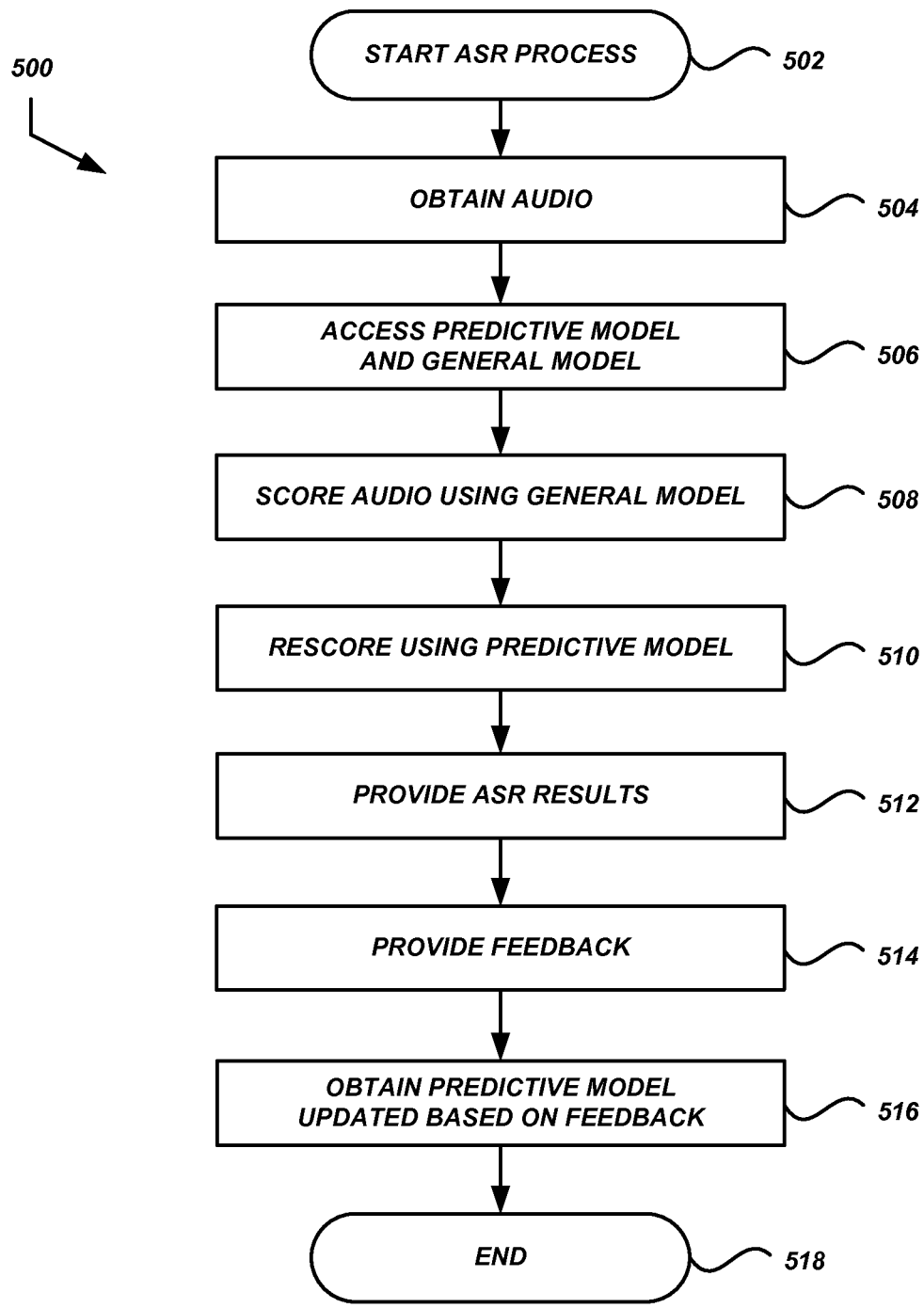
FIG. 5 is a flow diagram of an illustrative process for using predictive models and general models to perform automatic speech recognition.

At block 414 the process 400 terminates.
ASR with a Predictive Language Model FIG. 5 illustrates a sample process 500 for performing automatic speech recognition on an utterance using an updated model or multiple models, such as a general model and a predictive language model. Advantageously, an ASR module 110 may execute the process 500 to generate ASR results that are more accurate than ASR with only a general model when a new item or an item with variable demand is included in the input to be processed.

The process 500 begins at block 502. For example, process 500 may begin manually or automatically upon user-initiation of a speech recognition session, upon receipt of utterance audio, etc. The process 500 may be embodied in a set of executable program instructions stored on non-transitory computer-readable media, such as short-term or long-term memory of one or more computing devices associated with the language processing system 200. When the process 500 is initiated, the executable program instructions can be loaded and executed by the one or more computing devices.

At block 504, the ASR module 110 or some other module or component of the language processing system 200 obtains audio of the user utterance. The audio may be received from a user device 202 via a network 210, from a microphone of a computing device on which the ASR module 110 is executing, etc.

At block 506, the ASR module 110 or some other module or component of the language processing system 200 can access a predictive language model. Illustratively, the predictive language model may be a language model that has been generated and/or updated based on the language use prediction data as described above. In some embodiments, the predictive model may be a separate rule-based model that includes rules for re-scoring or otherwise adjusting general language model probabilities for recognized output to help choose between multiple alternative outputs based on current prediction. For example, the predictive model may include offsets, scaling factors, or replacement scoring data (e.g., probabilities, likelihoods, scores, etc.) that can be applied to ASR results generated using a general language model (e.g., applied to the probabilities, likelihoods, or scores associated with individual ASR results). In some embodiments, models may be domain-specific, and therefore more than one predictive model, general model and/or additional models may be available.

At block, 508, the ASR module 110 or some other module or component of the language processing system 200 can first score the audio using a general model. Illustratively, the ASR module 110 can generate a lattice or n-best list of initial results using the general model. Because the results are based on the general model, items recently added to a catalog or items with variable demand may not necessarily be recognized appropriately, may be ranked lower in the results than they should, etc.

At block, 510, the ASR module 110 or some other module or component of the language processing system 200 can re-score the results from the block 508 above using the predictive model in a process known as language model rescoring. Because the predictive model includes probabilities based on an expected usage of certain new terms or terms with variable demand, the rescored results may be more accurate after the language model rescoring than would otherwise be possible with the general model alone. Accordingly, a user experience may be improved. In some embodiments, language model interpolation may be used to perform ASR on the utterance using the multiple models, rather than language model rescoring.

At block 512, the ASR module 110 or some other module or component of the language processing system 200 can provide ASR results to another NLP component (e.g., an NLU module), an application module 1114, an external service, the user device 202, etc.

At block 514, the ASR module 110 or some other module or component of the language processing system 200 can provide feedback regarding ASR processing, as described above with respect to FIG. 4.

At block 516, an updated predictive model may be obtained. The predictive model may have been updated based on the feedback provided above. The updated model may then be used in subsequent executions of the process 500. In some embodiments, an updated model may be obtained each time feedback is provided. In other embodiments, an updated model may be obtained on some predetermined or dynamically determined schedule, or in response to some other event.

At block 518 the process 500 terminates.

TERMINOLOGY

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
      obtain item information regarding an item expected to be referenced in user utterances in a future period of time more often than the item was referenced in user utterances in a prior period of time;
      obtain language use prediction data regarding the item, the language use prediction data associated with one or more previously selected features;
      determine, using the language use prediction data and a machine learning model trained to generate probabilities based on the one or more previously selected features, a probability that the item will be referenced in user utterances in the future period of time;
      generate a predictive language model comprising a word in a name of the item and a corresponding probability related to the word, the corresponding probability based at least partly on the determined probability;
      determine a probability, from a general model, that the name of the item is included in a user utterance; and
      adjust the probability that the name of the item is included in the user utterance based at least on the corresponding probability indicated in the predictive language model.

2. The system of claim 1, wherein the item information comprises information regarding a plurality of items expected to become available in the future period of time, and wherein the plurality of items was not available in the prior period of time.

3. The system of claim 1, wherein the one or more previously selected features comprise at least one of: availability, expected release, price, sales, reviews, or occurrences of words in network content.

4. The system of claim 1, wherein the one or more processors are further configured to recognize the name of the item based on the probability that was adjusted using the natural language processing model.

5. A computer-implemented method comprising:
   under control of one or more computing devices configured to execute specific instructions,
      obtaining language use prediction data regarding an item;
      determining, using the language use prediction data and a machine learning model trained to generate probabilities based on the language use prediction data, probability information regarding a probability that the item will be referenced in a future utterance;
      modifying a natural language processing model based at least partly on the probability information;
      determining a probability, from a general model, that a name of the item is included in a user utterance; and
      adjusting, using the natural language processing model, the probability that the name of the item is included in the user utterance.

6. The computer-implemented method of claim 5, wherein the natural language processing model comprises an automatic speech recognition model or a natural language understanding model.

7. The computer-implemented method of claim 5, wherein the language use prediction data is independent of data used to train the natural language processing model.

8. The computer-implemented method of claim 5, wherein the language use prediction data comprises at least one of: news information, sales information, trending topic information, temporal information, or information from an application that uses the natural language processing model.

9. The computer-implemented method of claim 5, wherein the probability information comprises one of: an offset or a scaling factor.

10. The computer-implemented method of claim 9, wherein modifying the natural language model comprises adding the offset to a probability associated with a word in a name of the item.

11. The computer-implemented method of claim 9, wherein modifying the natural language model comprises scaling, using the scaling factor, a probability associated with a word in a name of the item.

12. The computer-implemented method of claim 5, further comprising recognizing a predicted word using the natural language processing model.

13. The computer-implemented method of claim 12, wherein the natural language processing model is used to rescore results generated using the general model.

14. The computer-implemented method of claim 12, wherein the natural language processing model is interpolated with the general model.

15. The computer-implemented method of claim 14, further comprising determining a first weighting factor for the natural language processing model and a second weighting factor for the general model.

16. The computer-implemented method of claim 5, wherein the general model is based on a vocabulary of words associated with a general population.

17. The computer-implemented method of claim 5, wherein determining a probability that the name of the item is included in a user utterance using a general model comprises performing automatic speech recognition on the user utterance using the general model to generate automatic speech recognition results, wherein the automatic speech recognition results comprise the name of the item and the probability that the name of the item is included in the user utterance.

18. The computer-implemented method of claim 17, wherein adjusting the probability that the name of the item is included in the user utterance using the natural language processing model comprises rescoring the automatic speech recognition results based on an expected usage of the name of the item.

19. One or more non-transitory computer readable media comprising executable code that, when executed, cause one or more computing devices to perform a process comprising:
    obtaining language use prediction data regarding an item;
    determining, using the language use prediction data and a learning model trained to generate probabilities based on the language use prediction data, probability information regarding a probability that the item will be referenced in a future utterance;
    generating a natural language processing model based at least partly on the probability information;
    determining a probability, from a general model, that a name of the item is included in a user utterance; and
    adjusting, using the natural language processing model, the probability that the name of the item is included in the user utterance.

20. The one or more non-transitory computer readable media of claim 19, wherein the natural language processing model comprises an automatic speech recognition model or a natural language understanding model.

21. The one or more non-transitory computer readable media of claim 19, wherein the language use prediction data is independent of data used to train the natural language processing model.

22. The one or more non-transitory computer readable media of claim 19, wherein the language use prediction data comprises at least one of: news information, sales information, trending topic information, temporal information, or information from an application that uses the natural language processing model.

23. The one or more non-transitory computer readable media of claim 19, the process further comprising receiving feedback regarding use of the natural language processing model.

24. The one or more non-transitory computer readable media of claim 23, the process further comprising modifying the natural language processing model based at least on the feedback.

25. The one or more non-transitory computer readable media of claim 23, wherein the natural language processing model is generated in response to receiving of the feedback information.

26. The one or more non-transitory computer readable media of claim 19, wherein the natural language processing model is used to rescore results generated using the general model.

27. The one or more non-transitory computer readable media of claim 19, wherein the natural language processing model is interpolated with the general model.

* * * * *